United States Patent [19]

Johnston

[11] 4,238,643
[45] Dec. 9, 1980

[54] STEAM POWERED PLANE OR VEHICLE

[76] Inventor: Caroline R. Johnston, 909 W. Central Ave. 205, Missoula, Mont. 59801

[21] Appl. No.: 21,773

[22] Filed: Mar. 20, 1979

Related U.S. Application Data

[63] Continuation-in-part of Ser. No. 743,788, Nov. 20, 1976, abandoned.

[51] Int. Cl.$^2$ .............................................. G21C 1/00
[52] U.S. Cl. ......................................... 179/39; 60/203
[58] Field of Search ..................... 176/36; 60/203, 259

[56] References Cited
PUBLICATIONS
Engineering (2/28/58) p. 268.
Popular Science (10/51) pp. 98–102.
Automotive Engineering (10/72) vol. 80, No. 10 pp. 21–29.

Primary Examiner—Stephen C. Bentley
Assistant Examiner—S. A. Cangialosi

[57] ABSTRACT

A steam propulsion system for planes or vehicles, which utilizes a directional thrust, generated by nuclear heated water and air.

1 Claim, 1 Drawing Figure

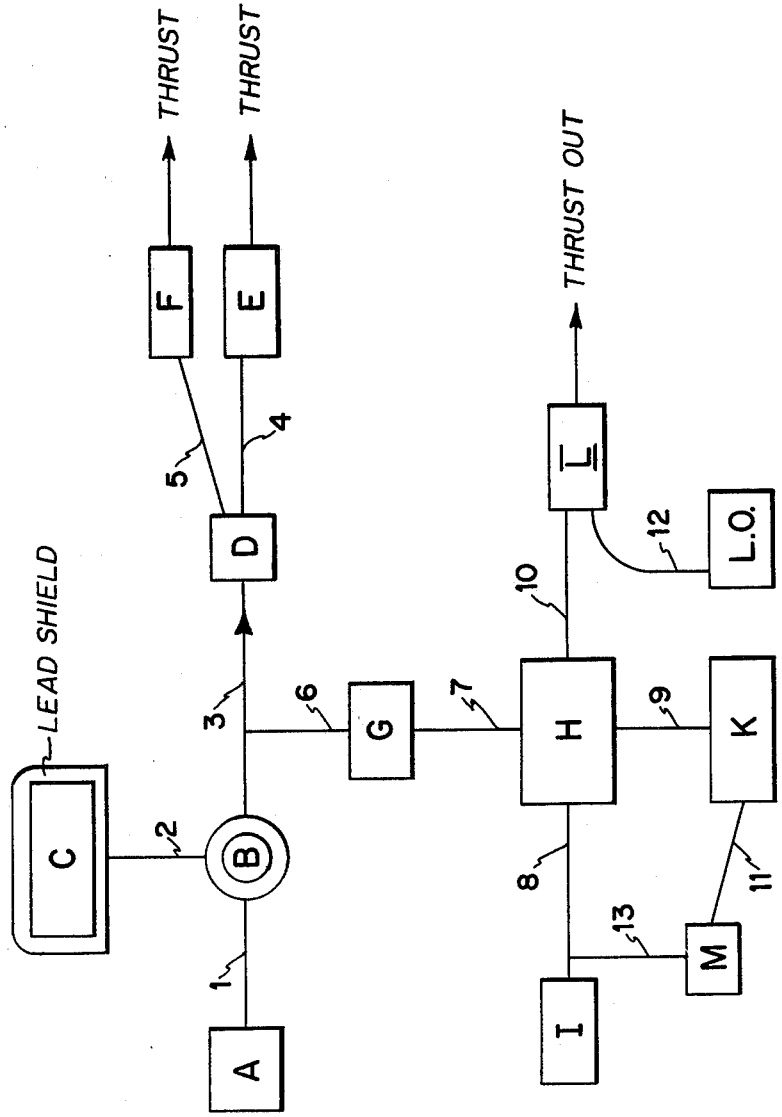

STEAM POWERED PLANE OR VEHICLE

BACKGROUND OF INVENTION

This invention is a continuation in part of Ser. No. 743,788 filed Nov. 20, 1976, now abandoned.

Nuclear powered aircraft similar but distinct from this invention can be found on page 268 of the Periodical Engineering dated Feb. 28, 1958 and entitled reactors in flight. (60-203). Popular Science October 1951, pps. 98 to 102. Entitled the first atomic airplane. (176-Digest 3) and Automotive Engineery October 1972 pages 21 to 29. entitled Space Shuttle Engines Stress Low Cost, Maintenance Resume. (60-25-9).

The above in no way suggests the novel combination of engines claimed.

Brief Description of Drawing

FIG. 1 shows a schematic view of the prefered embodiment of the steam propulsion system.

SUMMARY OF THE INVENTION

The present invention has as its object to provide a novel multi engine propulsion system, capable of propelling a vehicle within the atsmosphere of earth and beyond and may be able to be used in a ship or ocean going transit and above the stratosphere it may exceed 3 M or 4 M or even 5 -Ms speed that is as the fusilage will allow.

A propulsion system comprising

A. a source of liquid water.

B. a boiler (a sphere), means connected to said source of $H_2O$ by line 1. for converting said water to steam by means of line 2 to deliver a nuclear reactor to the boiler.

C. a reactor storage to hold 6 pellets or cores, made of a lead caseing for a shield, and line 2. to deliver one core at a time to the boiler.

D. a diverter switch connected to said steam boiler by line 3, having a plurality of outputs.

E. by line 4 of said outputs connected to the intake of a turbo-jet (E) wherein it is mixed with air and developes a directional thrust.

F. The other said output (of steam) being connected to the input or intake of a ramjet (F) by line 5, wherein it is mixed with air and developes a directional thrust.

G. By means of line 6 said steam also being connected to an electrical generator, means a magneto, so as to supply electricity to a storage battery by line 7.

H. Said battery connected to Auxiliary Equipment by line 8.

I. Auxiliary Equipment connected to storage battery by line 8.

K. Rocket connected to storage battery by line 9. and line 10 connecting storage battery to Ion-jet.

I claim:

1. Propulsion system comprising:
(a) a source of liquid water
(b) a boiler means connected to said source for converting said water into steam by means of a nuclear reactor
(c) a reactor pellet storage means having a plurality of reactor cores, said storage means connected to said boiler for delivering one of said cores at a time
(d) a diverter switch connected to said steam, said switch having a plurality of outputs
(e) one of said outputs being connected to the intake of a turbojet wherein it is mixed with air and developes a directional thrust
(f) the other of said outputs being connected to the intake of the ram jet wherein it is mixed with air and develops a directional thrust
(g) said steam also being connected to an electrical generating means so as to supply electricity
(h) a storage battery connected to said electricity generating means so as to supply electricity
(i) a source of liquid oxygen
(j) an ion jet having a plurality of inputs, one of said inputs being connected to said storage battery, another of said inputs being connected to source of liquid oxygen wherein said jet developes a directional thrust by means of a stream of oxygen ions
(k) a rocket control means connected to said storage battery
(l) a rocket connected to said rocket control means Line 11 goes line from rocket to the controls on control panel M.
(l) Ion jet has power line No. 10 to storage battery and connecting line No. 12 to the Liquid Oxygen tank, as electrical power and the Liquid Oxygen converge into the Ion jet equals a thrustout and high speeds will take place L.O. represents Liquid Oxygen storage tank
(m) All the control switches for all the different components of said propulsion system are to be placed on the control panel of said plane or vehicle and the control throttle for the steam control Line #13 connecting controls to the storage battery.

* * * * *